3,131,225
TRIALKYLBORANE DISPLACEMENT REACTIONS

Alfred J. Rutkowski, Colonia, Elroy J. Inchalik, Cranford, and Alan Schriesheim, Berkeley Heights, N.J., assignors to Esso Research and Engineering Company, a corporation of Delaware
No Drawing. Filed Aug. 3, 1961, Ser. No. 128,980
11 Claims. (Cl. 260—606.5)

This invention relates to the discovery of a novel catalyst for displacement reactions involving alkylborane compounds. More particularly this invention relates to a process for displacing an alkyl group from an alkylborane compound with an olefin to form a new alkylborane and an olefin corresponding to the alkyl group of the initial alkylborane in the presence of certain novel alkylborane displacement catalysts.

Alkylborane chemistry has been recently recognized as having great potential for the production of various chemical compounds both as intermediates and as end-use products. Typical of the reactions involving alkylboranes are displacement, isomerization, especially double bond isomerization, oxidation to form borate esters, hydrolysis of borate esters to form the corresponding alcohols, and various other reactions. Alkylborane chemistry is particularly suitable for the preparation of certain olefins.

In general, prior art double bond isomerization processes tend to migrate the double bond inwardly toward the center of the molecule such that an alpha olefin is readily isomerized to an internally double bonded olefin by various techniques. There are no commercial processes today, however, which would provide an economic method for migrating the double bond of an olefin toward the alpha or terminal position whereas the alpha olefins are extremely valuable intermediate compounds useful in the manufacture of many products including detergent alkylates, sulfated detergents, primary alcohols, and the like.

Alkylborane isomerization is accomplished by reacting an alkylborane wherein the boron atom is linked to an internal carbon atom of the alkyl group, under isomerization conditions known in the art, to effect a migration of the linking bond to a terminal carbon atom of the alkyl radical. In order to generate an alpha olefin corresponding to the alkyl group of the isomerized alkylborane, it is necessary to either displace the alkyl group or decompose the alkylborane compound. This invention relates in particular to the displacement of the alkyl group or groups in the alkylborane compound by an olefin having the same or different molecular weight and/or isomeric structure. This displacement reaction is generally quite slow even under elevated temperatures, superatmospheric pressures and greater than stoichiometric amounts of olefin. For this reason the displacement reaction has not in the past been found to be attractive from an economic standpoint.

It is one object of this invention to provide the displacement reaction referred to with a novel type of catalyst which will markedly increase the reaction rate to thereby provide an economic process for the production of olefins. In order to visualize the invention with more clarity, the following general description will set out the conditions usually employed for the process. As to the displacement reaction, temperatures in the range of 50 to 250° C., and preferably 100 to 150° C., are employed; higher or lower temperatures may be employed, depending on the activity of the particular catalyst and the particular alkylborane involved in the reaction. Pressures similarly may vary between 0 and 5000 p.s.i.g. and are preferably maintained between 0 and 3500 p.s.i.g. If the reaction rates are sufficiently high at atmospheric pressures, this will of course be preferred. The displacement reaction is more specifically defined as follows: One mole of trialkylborane reactant is reacted with three moles of olefin. The alkyl groups attached to the boron atom of the alkylborane reactant are the same or different and contain from 2 to 20 carbon atoms or more. The olefin reactant will have from 2 to 20 or more carbon atoms and if desired mixed olefins of different isomeric structure and/or molecular weight may be employed. When reacted, the alkyl groups attached to the boron atom of the alkylborane reactant are displaced by the olefin reactant leaving as product one mole of trialkylborane wherein the alkyl groups correspond in chain length to the olefin reactant. There is also generated three mols of olefin product corresponding in chain length to the alkyl groups in the alkylborane reactant. A typical reaction is illustrated by the following chemical equation:

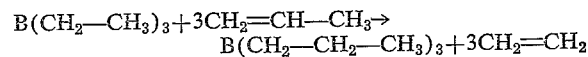
$$B(CH_2-CH_3)_3 + 3CH_2=CH-CH_3 \rightarrow$$
$$B(CH_2-CH_2-CH_3)_3 + 3CH_2=CH_2$$

While in most cases the alkylborane reactant will contain three alkyl groups of the same molecular weight and structure, e.g. triethylborane, tributylborane, triamylborane, etc. on up to $C_{20}$, it is not uncommon to have mixed alkyl groups such as dibutylethylborane, diethylhexylborane, diisobutylamylborane, dicyclohexylethylborane, isobutylamylethylborane, dioctyldecylborane, didodecyloctadecylborane, didecylbutylborane, hexyloctyldecylborane, and so forth.

The alkyl group of the alkylborane reactant may be normal, i.e. straight chained where the boron atom is linked to a terminal carbon atom of the alkylborane, e.g.

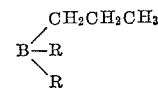

or it may represent an isoalkyl radical wherein the linkage is between the boron atom and an internal carbon atom, e.g.

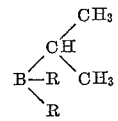

The alkylborane compound may contain alkyl groups of higher or lower molecular weight than the olefin reactant. Hence, as examples

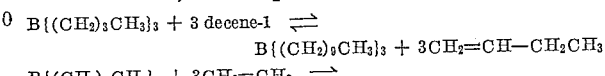

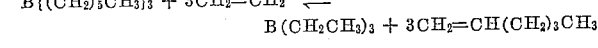

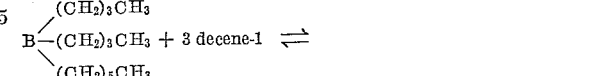

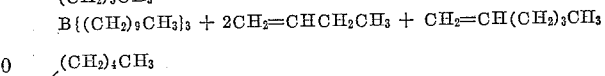

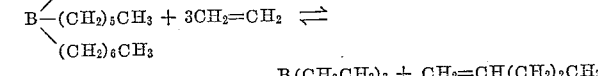

To further illustrate, triethylborane may be reacted with 3 moles of hexene-2 to obtain tri-secondary-hexylborane and 3 moles of ethylene. Having thus prepared tri-secondary-hexylborane, it is then possible to subject this organoboron compound to isomerization conditions which process forms no part of the present invention. The tri-secondary-hexylborane under isomerization conditions may be converted to tri-n-hexylborane. The tri-n-hexylborane may then be further reacted with another olefin to undergo a second displacement reaction, e.g. with ethylene, to produce triethylborane and hexene-1, a valuable normal alpha olefin. The remaining triethylborane compound is, of course, available for further reaction.

In the displacement reaction it is preferred to employ approximately stoichiometric quantities of olefin to alkylborane, i.e. 3 moles of olefin per mole of trialkylborane. However, substantial latitude in the olefin to trialkylborane ratio is permissible and the ratio may vary between 0.1–6:1 and higher of olefin to trialkylborane. These ratios apply in the case of displacing a relatively lower molecular weight alkyl radical with a relatively higher molecular weight olefin and vice-versa, a higher molecular weight alkyl with a lower molecular weight olefin.

The following compounds are illustrative of the trialkylborane reactant which may be employed in the present invention: triethyl, tripropyl, tributyl, tri-2-ethylhexyl, butyldiethyl, methyl-di-2-ethylhexyl, tricyclohexyl, cyclohexyldiethyl, and so forth.

The following compounds illustrate the olefins employable in the present displacement reaction which are especially suitable for the present purposes: ethylene, propylene, butene-1, butene-2, pentene-1, pentene-2, 2-methyl-butene-1, 2-methyl-butene-2, 3-methyl-butene-1, hexene - 1, hexene - 2, hexene - 3, 2,3 - dimethyl - butene - 1, 2,3 - dimethyl - butene - 2, 2 - methyl - pentene - 2, 2 - methyl - pentene - 1, 4 - methyl - pentene - 2, 4 - methyl - pentene - 1, 3 - methyl - pentene - 2, heptene - 1, heptene - 2, heptene - 3, 2,4 - dimethyl - pentene - 2, 2,4 - dimethyl - pentene - 1, 2,3,3 - trimethyl-butene-1, octene-1, octene-2, octene-3, octene-4, 2-methyl-heptene - 1, 2 - methyl - heptene - 2, 2 - methyl - heptene - 3, 2,3,3 - trimethyl - pentene - 1, 2,4,4 - trimethyl - pentene - 1, 3 - ethyl - hexene - 2, 2 - ethyl - hexene - 2, decene - 1, 2 - methyl - decene - 1, 2 - methyl-nonene - 2, decene - 2, dodecene - 1, dodecene - 2, 2 - methyl - decene - 1, 2 - methyl - decene - 2, 3 - propyl - decene - 1, 2 - ethyl - decene - 4, tetradecene - 3, tetradecene - 4, octadecene - 2, 2 - ethyl - hexadecene - 2, 2-methyl-octadecene-2, and the like.

It has now been discovered that a compound having certain chemical and physical characteristics when employed in catalytic amounts will substantially increase the displacement reaction rate. The catalyst of this invention comprises an organic compound, i.e. containing a carbon atom, with at least one functional group containing an atom selected from the group consisting of sulfur, nitrogen, selenium and phosphorus. The catalyst should be aprotic, that is to say there should be no available reactive hydrogen atoms present. It must be strongly basic, dipolar, non-hydroxylic, and preferably the catalyst should be soluble under reaction conditions and have a high dielectric constant, i.e. over 6.

As to the sulfur-containing compounds, there may be employed sulfides, e.g. $R_2S$ wherein the R groups may comprise the same or different non-olefinic hydrocarbon radicals either alkyl, cycloalkyl, aryl, alkaryl or aralkyl. Typical of the sulfides which may be employed are dimethylsulfide, dibutylsulfide, methyl butyl sulfide, diphenylsulfide, didodecylsulfide, di-o-methyl phenyl sulfide, dicyclohexylsulfide, diallylsulfide, etc.

Sulfoxides of the formula $R_2SO$ are also valuable as catalysts since they are dipolar, aprotic, non-hydroxylic and have dielectric constants above about 6. Examples of sulfoxides which may be employed include dimethylsulfoxide, dibutylsulfoxide, diphenylsulfoxide, methyl phenyl sulfoxide, diallyl sulfoxide, dicyclohexylsulfoxide, didodecyl sulfoxide, and the like. R may represent a hydrocarbon radical as in the sulfides.

Sulfones are also valuable catalysts for increasing the reaction rate of displacement reactions. Sulfones have the formula $R_2SO_2$ where R is the same as indicated for the sulfides and sulfoxides. Typical of the sulfones employable as catalysts are dimethyl sulfone, diethyl sulfone, diamyl sulfone, diphenyl sulfone, methyl α-naphthyl sulfone, diallyl sulfone, dicyclohexyl sulfone, didodecyl sulfone, and the like.

As to the nitrogen-containing functional groups, the substituted urea compounds are especially active as catalysts for the displacement reaction referred to above. In keeping with the general requirement that the catalysts be aprotic, the nitrogen atoms are fully substituted, i.e. contain no active hydrogen. These ureas may be described by the following chemical equation:

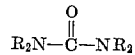

wherein R is a hydrocarbon radical as defined above. Typical ureas include tetramethyl urea, tetraethyl urea, tetraphenyl urea, tetracyclohexyl urea, N,N-dimethyl-N',N'-diethyl urea, N,N'-dimethyl ethylene urea, N,N'-diphenyl ethylene urea, N,N-diphenyl-N',N'-dimethyl urea, tetraisobutylurea, tetraallyl urea, and the like.

Included in the urea category are the thioureas described by the equation:

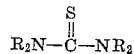

which include as examples the following: tetramethyl thiourea, tetraethyl thiourea, tetraphenyl thiourea, N,N-diethyl - N',N' - diamylthiourea, N,N' - dimethyl ethylene thiourea, N,N'-diphenyl ethylene thiourea, tetraallyl thiourea.

Various substituted amides such as N,N-dimethyl formamide, N,N-diphenyl formamide, N,N-ethyl phenyl formamide, N,N-dimethyl acetamide, N,N-dimethyl valeramide, tetramethyl adipamide, tetramethyl phthalamide, are also valuable catalysts for the present purposes.

Miscellaneous nitrogen-containing compounds include N,N-dimethyl aniline, tributyl amine, pyridine, pyridine N-oxide, nitrobenzene, n-methyl piperidine, N,N-dimethyl p-nitro aniline, and benzonitrile. Oxygen-containing functional groups are employable but not preferred since their activity is not as great as the other described previously. Among the oxygen compounds, the ketones are included, e.g. acetone, methylethylketone, and diethyl ketone.

As to the phosphorous-containing functional groups, there are included tertiary phosphines ($R_3P$), tertiary phosphine oxides ($R_3PO$), tertiary phosphites $(RO)_3P$, tertiary thiophosphites $(RS)_3P$, tertiary phosphates

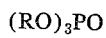

tertiary thiophosphates $(RS)_3PO$, where R is as defined above.

Examples of these phosphorous derivatives follow.

*Tertiary phosphines.*—Trimethylphosphine, triethylphosphine, triamylphosphine, tricyclohexylphosphine, tricyclopentylphosphine, tridodecylphosphine, triphenylphosphine, tri-p-toluylphosphine, dimethylethylphosphine, didecylmethylphosphine, diphenylbutylphosphine, methylethylbutylphosphine, propylphenylcyclohexylphosphine, tri-o-chlorophenyl phosphine, tri-p-N,N-dimethyl analino phosphine, tri-o-methoxyphenylphosphine.

*Tertiary phosphine oxides.*—Trimethylphosphine oxide, triethylphosphine oxide, trihexylphosphine oxide, tridecylphosphine oxide, tricyclohexylphosphine oxide, tricyclopentylphosphine oxide, triphenylphosphine oxide, tri-α-naphthyl phosphine oxide, dimethylethylphosphine oxide, diphenyl butyl phosphine oxide, methylethylbutylphosphine oxide, tri-o-chlorophenylphosphine oxide, tri-o-methoxyphenylphosphine oxide.

*Tertiary phosphites.*—Trimethylphosphite, triethylphosphite, trihexylphosphite, diethylmethylphosphite, tricyclohexylphosphite, tricyclopentylphosphite, triphenylphosphite, tri-p-toluylphosphite, tri-o-chlorophenylphosphite, tri-o - methoxyphenylphosphite, diphenylbutylphosphite, triallylphosphite.

*Tertiary thiophosphites.*—Trimethylthiophosphite, triethylthiophosphite, tridecylthiophosphite, tricyclohexylthiophosphite, triphenylthiophosphite, tri - p - toluylthiophosphite, diphenylmethylthiophosphite, triallylthiophosphite.

*Tertiary phosphates.*—Trimethylphosphate, triethylphosphate, tributylphosphate, tridecylphosphate, tricyclohexylphosphate, triphenylphosphate, dibutylmethyl phosphate, diphenylmethylphosphate, triallylphosphate.

*Tertiary thiophosphates.*—Trimethylthiophosphate, triethyl thiophosphate, triphenylthiophosphate, dibutylmethyl thiophosphate, triallyl thiophosphate.

Another variety of phosphorous-containing functional groups include the amides of phosphorous acids such as the amides of tertiary phosphorous acids $(R_2N)_3P$, the amides of tertiary phosphoric acid $(R_2N)_3PO$, examples of which follow:

*N,N′N″ hexaalkyl amides of tertiary phosphorous acids.*—Hexamethyl phosphorous triamide, hexaethyl phosphorous triamide, hexadodecyl phosphorous triamide, hexaphenyl phosphorous triamide, N,N-dimethyl-N′,N′-diethyl-N″,N″-diphenyl phosphorus triamide, hexacyclohexyl phosphorous triamide, hexaallyl phosphorous triamide.

*N,N′,N″ hexaalkyl amides of tertiary phosphoric acids.*—Hexamethyl phosphoric triamide, hexaethyl phosphoric triamide, hexadodecyl phosphoric triamide, hexaphenyl phosphoric triamide, N,N-dimethyl-N′,N′-diethyl-N″,N″-didodecyl phosphoric triamide (hexaalkylphosphoramide), phosphoric triamide, hexacyclohexyl phosphoric triamide, hexaallyl phosphoric triamide.

Other miscellaneous derivatives of phosphorous-containing functional groups include the following: triphenylphosphine - ethylidenimine, trimethylphosphine - phenylidenimine, N,N-dipropylphosphinamide, N,N-diphenylphosphinamide, N,N,N′,N′-tetraethyl-benzene phosphondiamide, N,N,N′,N′-tetramethylbenzenethionophosphondiamide, ethyl N-methylimidophosphite, phenyl N-ethylimidophosphite, trimethylthio-thionophosphate.

Thus, it can be seen that the catalyst employable herein may be characterized as hydrocarbon substituted compounds containing a functional radical selected from the group consisting

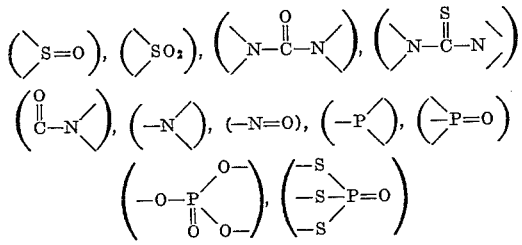

wherein the open bonds are attached to hydrocarbon radicals.

In particular, the hydrocarbon substituted trialkyl phosphates, tetraalkyl ureas, the polyalkylated phosphoramides, the dialkyl formamides, and the dialkyl sulfoxides wherein the alkyl groups of the aforementioned compounds contain from 1-8 carbon atoms are preferred.

In the process of this invention the displaced alkyl group which is converted to the olefin is continuously removed from the reaction zone by distillation during the reaction, although this is not necessary. It is to be understood that if the displaced or generated olefin is not removed the molar ratios of reactants will tend to favor a reverse displacement so that the reaction mixture will reach a point of equilibrium.

To further illustrate the present invention, reference is now had to the following example.

EXAMPLE 1

There was employed an apparatus consisting of a 50 ml. flask equipped with a condenser which in turn was attached to a graduated cylinder. The graduated cylinder was filled with water and inverted in a water reservoir for the purpose of measuring gaseous olefins given off during the reaction by water displacement. Before commencing with the experiment, the apparatus was flushed out with dry nitrogen and 3.6 g. (0.02 mole) of tri-n-butylborane and 8.4 g. (0.06 mole) of decene-1 were then added. In this experiment no catalyst was employed. The flask was immersed in a constant temperature bath at 150° C. for 800 minutes. The butene that evolved was measured and plotted as a function of time. In this experiment with no catalyst a total of 50% of the theoretical amount of butene was evolved and passed into the graduated cylinder at the end of the run. The temperature of the constant temperature bath was controlled to ±0.5° C. and the reaction was essentially at atmospheric pressure.

In order to evaluate the relative rates of reaction in displacing the alkyl group of alkylboranes, a series of tests were carried out exactly as described in Example 1 except for the use of the catalysts indicated in the following table. The catalysts were employed as stated in amounts of 1–10 wt. percent and were added together with the other reactants, namely, the trialkyl borane and olefin. In the following table the relative rate of reaction was arbitrarily set at 1 for the evolution of 50% of the theoretical amount of butene during a given time period, i.e. 800 minutes. The relative rates of the reaction employing the various catalysts were calculated as follows:

$$\frac{T}{T_c} = \text{Relative rate}$$

wherein $T_c$ is equal to the time required to obtain 50% evolution of the theoretical amount of butene with the designated catalyst and $T$ represents the time without utilizing the catalyst.

*Table I*

| Catalyst | Relative rate at— | | Dielectric constant |
| --- | --- | --- | --- |
| | 1 wt. percent | 10 wt. percent | |
| None | 1 | 1 | |
| Triethylphosphate | 1.65 | 2.28 | 8 |
| N,N′-dimethyl-N,N′-diethyl urea | 1.67 | 2.22 | 17 |
| Hexamethyl phosphoric triamide | 1.69 | 2.35 | 36 |
| Dimethylformamide | 2.43 | 3.33 | 37.6 |
| Tetramethylurea | 2.98 | 3.03 | 24 |
| Dimethylsulfoxide | 2.33 | 2.81 | 45 |
| Dibutyl sulfide | 1.67 | | |

As illustrated, only small amounts of catalyst are necessary to obtain a significant increase in reaction rate. An optimum case, for example, with tetramethylurea, the relative rate with 1% catalyst was 2.98, increasing the catalytic quantities to 10 wt. percent only slightly increasing the realtive rate to 3.03. Other catalysts showed larger increases in reaction rate when changing from 1 wt. percent to 10 wt. percent catalyst, but in all cases the increase in reaction rate with the increase of catalyst from 1 to 10 wt. percent was not considered significant enough to justify the use of larger amounts of catalyst. It is considered therefore that the preferred catalytic quantities employed herein should be maintained between about 0.1–10 wt. percent and more preferably between 0.5–5 wt. percent although these ranges can be exceeded on either side without deviating from the scope and spirit of the invention hereinafter claimed.

The weight percent of catalyst as referred to herein is based on the stoichiometric total concentration of borane and olefin, that is to say any amounts of borane or olefin in excess of stoichiometric are not utilized to calculate the weight percent of catalyst.

What is claimed is:

1. In a process wherein an olefin is reacted with an alkylborane compound to obtain a displacement of alkyl radical under elevated temperatures, the improvement which comprises employing as a catalyst an aprotic, basic, dipolar, non-hydroxylic compound having a dielectric constant over 6 selected from the group consisting of tertiary phosphate ester, tetraalkyl urea, N,N-dialkyl amide, dialkyl sulfoxide, dialkyl sulfide and hexaalkyl amide of tertiary phosphoric acid.

2. A process in accordance with claim 1 wherein said catalyst is a tertiary phosphate ester.

3. A process in accordance with claim 1 wherein said catalyst is a tetraalkyl urea.

4. A process in accordance with claim 1 wherein said catalyst is an N,N-dialkyl amide.

5. A process in accordance with claim 1 wherein said catalyst is a dialkyl sulfoxide.

6. A process for displacing an alkyl radical contained in a starting alkylborane compound with an olefin to obtain a new alkyl borane compound and an olefin corresponding to an alkyl group on said starting alkylborane compound which comprises contacting said starting alkylborane compound with an olefin in an olefin to alkylborane ratio of 0.1–6:1 at a temperature of 50–250° C. for a time sufficient to displace at least a portion of said alkyl groups on said starting alkylborane in the presence of from 0.1–10 wt. percent of a catalyst which comprises an aprotic, basic, dipolar, non-hydroxylic compound having a dielectric constant over 6 selected from the group consisting of tertiary phosphate ester, tetraalkyl urea, N,N-dialkyl amide, dialkyl sulfoxide, dialkyl sulfide and hexaalkyl amide of tertiary phosphoric acid, said weight percent being based on the stoichiometric total concentration of borane and olefin.

7. A process in accordance with claim 6 wherein said catalyst is present in an amount between 0.5–5 wt percent.

8. A process in accordance with claim 6 wherein said catalyst is a tertiary phosphate ester.

9. A process in accordance with claim 6 wherein said catalyst is a tetraalkyl urea.

10. A process in accordance with claim 6 wherein said catalyst is an N,N-dialkyl amide.

11. A process in accordance with claim 6 wherein said catalyst is a dialkyl sulfoxide.

No references cited.